United States Patent
Raj et al.

(10) Patent No.: US 10,735,252 B2
(45) Date of Patent: Aug. 4, 2020

(54) OUTSIDE ROUTER FAULT DETECTION

(71) Applicant: HEWLETT PACKARD ENTERPRISE DEVELOPMENT LP, Houston, TX (US)

(72) Inventors: Anil Raj, Karnataka (IN); Anoop Govindan Nair, Karnataka (IN); Srijith Ponnappan, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 27 days.

(21) Appl. No.: 16/047,341

(22) Filed: Jul. 27, 2018

(65) Prior Publication Data

US 2020/0036580 A1    Jan. 30, 2020

(51) Int. Cl.
*H04L 12/24* (2006.01)
*H04L 12/721* (2013.01)
*H04L 12/741* (2013.01)

(52) U.S. Cl.
CPC .......... *H04L 41/0677* (2013.01); *H04L 45/12* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 7,921,219 B2* | 4/2011 | Ginsberg | H04L 45/28 370/235 |
| 7,961,601 B2 | 6/2011 | Lu et al. | |
| 8,068,409 B2 | 11/2011 | Kumaresan et al. | |
| 8,149,690 B1* | 4/2012 | Kakkar | H04L 45/00 370/219 |
| 8,488,444 B2 | 7/2013 | Filsfils et al. | |
| 2006/0153067 A1* | 7/2006 | Vasseur | H04L 45/02 370/217 |
| 2009/0129387 A1* | 5/2009 | Retana | H04L 45/04 370/392 |

OTHER PUBLICATIONS

IP Routing BFD Configuration Guide, Cisco IOS Release 15E, Cisco, Retrieved on May 14, 2018, 7 Pgs. https://www.cisco.com/c/en/us/td/docs/ios-xml/ios/iproute_bfd/configuration/15-e/irbfd-15e-book/irbfd-bfd-static-route-supp.html.

J. Moy, Network Working Group, Request for Comments: 2328, STD: 54, Obsoletes: 2178. Category: Standards Track, OSPF Version 2, Apr. 1998 (407 pages).

(Continued)

*Primary Examiner* — Kouroush Mohebbi
(74) *Attorney, Agent, or Firm* — Trop, Pruner & Hu, P.C.

(57) ABSTRACT

In some examples, a first router establishes a fault detection session between the first router connected to a routing area and an outside router assigned a forwarding address, the outside router located outside the routing area, and the forwarding address used by a second router of the routing area to send a data packet to the outside router. The first router detects, in the fault detection session, a fault associated with the outside router, and in response to detecting the fault associated with the outside router in the fault detection session, provides an indication to the routing area that the forwarding address is no longer accessible.

20 Claims, 5 Drawing Sheets

(56) References Cited

OTHER PUBLICATIONS

Katz et al., Internet Engineering Task Force (IETF), Request for Comments: 5882, Category: Standards Track, ISSN: 2070-1721, Generic Application of Bidirectional Forwarding Detection (BFD), Jun. 2010 (17 pages).
Katz et al., Internet Engineering Task Force (IETF), Request for Comments: 5880, Category: Standards Track, ISSN: 2070-1721, Bidirectional Forwarding Detection (BFD), Jun. 2010 (49 pages).
P. Murphy, US Geological Survey, Network Working Group, Request for Comments: 3101, Obsoletes: 1587, Category: Standards Track, The OSPF Not-So-Stubby Area (NSSA) Option, Jan. 2003 (33 pages).
Wikipedia, Border Gateway Protocol last edited Jun. 20, 2018 (18 pages).
Wikipedia, Link-state advertisement last edited Mar. 9, 2018 (10 pages).
Wikipedia, Open Shortest Path First last edited Jun. 10, 2018 (15 pages).
Wikipedia, Routing Information Protocol last edited Jun. 4, 2018 (7 pages).

* cited by examiner

OUTSIDE ROUTER FAULT DETECTION

BACKGROUND

Devices can communicate over networks, which can include wired networks and/or wireless networks. Routers can be included in a network to transfer data between devices. Various routing protocols can be used by routers to route data along paths of the network to target devices.

BRIEF DESCRIPTION OF THE DRAWINGS

Some implementations of the present disclosure are described with respect to the following figures.

Figure 1:
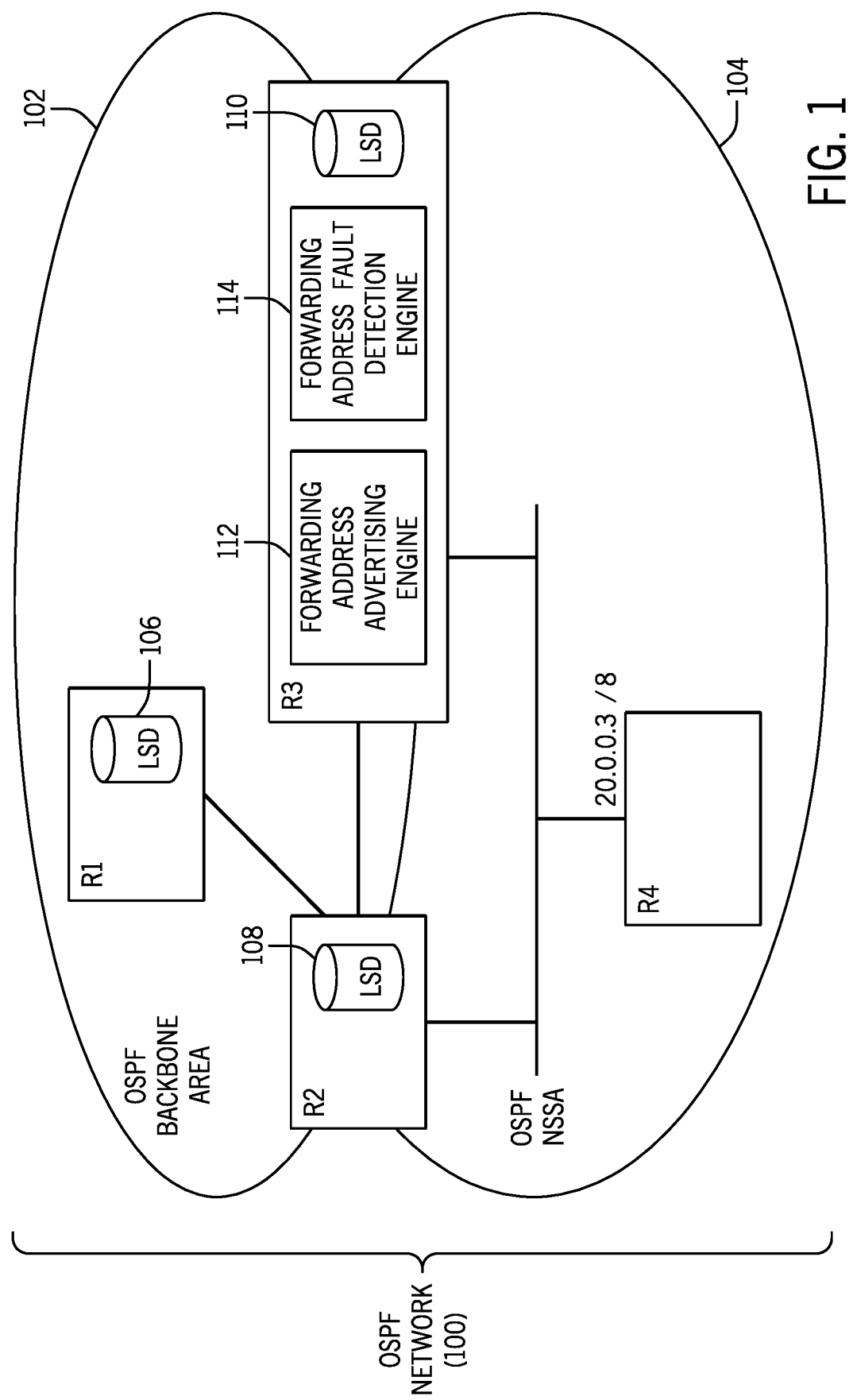
FIG. 1 is a block diagram of a network arrangement according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "router" can refer to a network device, located within a network, which receives a data packet and forwards the data packet along a path of the network toward a target device (or multiple target devices). The data packet is originated from a source device. The router can select a path from among multiple different paths of the network over which the data packet is to be forwarded. In some cases, multiple routers may be involved in routing data packets originated by a source device to target device(s). A router can receive a data packet from the source device or from another router, and the router can forward the data packet over a selected path to another router or to a target device(s).

A "data packet" can refer to any unit of data that can be conveyed over a network. A data packet may also be referred to as a data frame, a data unit, a protocol data unit, and so forth.

A routing protocol specifies how routers of a network are able to communicate with each other. Using the routing protocol, routers are able to distribute information that enables the routers to perform routing of data packets.

An example of a routing protocol that can be used in a network is an Open Shortest Path First (OSPF) protocol. An OSPF network can be structured, or subdivided, into routing areas to simplify administration and enhance traffic and resource utilization. One of the routing areas of the OSPF network is a core or backbone area. Each of the other routing areas of the OSPF network has a connection (either a direct connection or an indirect connection through routers) to the OSPF backbone area. A topology of a given routing area is unknown outside the given routing area.

OSPF allows for use of a forwarding address to use in forwarding a data packet to an "outside" router that is outside of a given OSPF routing area or an OSPF domain. As explained further below in various contexts, the use of a forwarding address, which is the network address (e.g., an Internet Protocol (IP) address) of the outside router, can allow for a data packet to be routed to the outside router without an extra hop through a boundary router (that discovered a route to the outside router) at a boundary between OSPF routing areas or between an OSPF domain and an external domain.

The outside router can be located in a not-so-stubby area (NSSA) (which is a specific type of an OSPF routing area), or alternatively, the outside router can be located in an external domain.

An NSSA is discussed further below.

An external domain is a domain that is external of an OSPF domain, which includes a collection of the OSPF routing area(s) of an OSPF network. The external domain can employ a routing protocol different from the OSPF protocol of the OSPF domain. The different routing protocol can include a Border Gateway Protocol (BGP), a Routing Information Protocol (RIP), or another routing protocol.

If the outside router that is assigned a forwarding address experiences a fault (e.g., the outside router becomes non-operational, the outside router experiences an error, a link to the outside router becomes non-operational, etc.), then OSPF supports convergence that detects changes in an OSPF network (such as due to a router or link fault) and recalculates new routes in response to the detected changes (e.g., new routes that bypass faulty links or routers). The OSPF convergence process can take a relatively long period of time (e.g., on the order of seconds), which may be considered to be excessive and thus unacceptable for some applications and/or users.

In accordance with some implementations of the present disclosure, a fault detection session is established between an OSPF router connected to an OSPF routing area and an outside router assigned a forwarding address to allow for faster detection of a fault associated with a forwarding address (that is assigned to the outside router). The fault detection session allows for the detection of a fault associated with a forwarding address to allow for recovery from the fault in a shorter amount of time than possible using OSPF convergence.

The fault detection session allows the OSPF router to detect a fault associated with the outside router (either a fault of the outside router itself or a fault of a link to the outside router). A "link" can refer to a path, whether logical or physical, between network devices, such as routers. In response to detecting the fault associated with the outside router in the fault detection session, the OSPF router can quickly provide an indication to the OSPF area (or OSPF domain) that the forwarding address is no longer accessible so that route(s) to the forwarding address can be withdrawn. In response to the indication, the other OSPF routers in the OSPF area (or OSPF domain) can remove routes to the forwarding address so that the other OSPF routers do not attempt to use such routes to the outside router.

In the ensuing discussion, reference is made to use of the OSPF protocol. It is noted, however, that techniques or mechanisms according to some implementations of the present disclosure can be applied in the context of other types of routing protocols.

FIG. 1 is a block diagram of an example network arrangement that includes an OSPF network 100. The OSPF network 100 can also be referred to as an OSPF domain. In the example of FIG. 1, the OSPF network 100 includes two routing areas: a backbone area 102 and a not-so-stubby area (NSSA) 104.

Although just two OSPF routing areas are shown in the example of FIG. 1, it is noted that there may be additional OSPF routing areas connected (directly or indirectly) to the backbone area 102.

An NSSA is a type of stub area that can import external routes (of external domains) and send information of the external routes to other routing areas of the OSPF domain 102. A stub area that is not an NSSA refers an OSPF routing area that does not receive route advertisements of routes external to an OSPF domain.

The routers of the backbone area 102 include routers R1, R2, and R3. A router of the NSSA 104 includes a router R4. Although a specific number of routers is shown in FIG. 1, it is noted that in other examples, a different number of routers can be used.

The routers R2 and R3 are "boundary" routers located at a boundary between the backbone area 102 and the NSSA 104. More specifically, the routers R2 and R3 in the example of FIG. 1 are area border routers (ABRs), each providing a connection between the backbone area 102 and another routing area (which in the case of FIG. 1 is the NSSA 104).

A router at the boundary between an OSPF domain and an external domain (that is outside the OSPF domain) is able to discover external routes in the external domain, where an external route can refer to a route between routers connected to or part of the external domain. In the example of FIG. 1, the router R4 is an outside router, and a route to the router R4 is an external route. In the ensuing discussion, the router R4 is referred to as an "outside router," since the router R4 is in a routing area (e.g., the NSSA 104) outside of another routing area (e.g., the backbone area 102).

Each router R1, R2, and R3 of the backbone area 102 maintains a respective link-state database (LSD) 106, 108, and 110. Each LSD can be stored on a storage medium in a respective router, or can be stored on a storage medium external of but accessible by the respective router. An LSD describes a topology of a collection of routers (including the routers R1-R4 in the FIG. 1 example). In some examples, an LSD describes a directed graph, in which the vertices of the graph represent respective routers, and an edge between vertices represents a connection between the corresponding routers. More generally, an LSD describes a network topology map of an OSPF domain. The state of a given route in the network is the cost (which can represent an overhead to send packets over an interface of a router, for example) over the network. An OSPF routing algorithm applied by a router calculates the cost of each of multiple routes to any given reachable destination. The selection of a route can be based on a comparison of the costs of different routes.

If other routing protocols different from the OSPF protocol are used, then instead of the LSDs, each router can include or have access to forwarding information (or routing information) that can be used by the router to forward data packets along respective paths in a network.

In the NSSA 104, an external route (such as a route to the outside router R4) is seen as an NSSA route internally but as an external route outside the NSSA 104. For example, the route to the router R4 is seen as an external route by a router of the backbone area 102.

The OSPF routing protocol uses packets referred to as link-state advertisements (LSAs) to provide information of a network topology seen by each router. A router sends an LSA to advertise the network topology that includes routes connected to interfaces of the router. A router receiving an LSA adds the route information in the received LSA to the LSD of the receiving router.

There are various different types of LSAs. One type of LSA is a Type 5 LSA, which contains information imported into an OSPF domain from an external domain that uses a routing protocol different from the OSPF protocol. A Type 5 LSA describes routes to destinations that are external of the OSPF domain (a domain including routers that use the OSPF routing protocol).

Another type of LSA is a Type 7 LSA, which is sent by a router in an NSSA (e.g., 104 in FIG. 1). For example, the router R4 in the NSSA 104 can send a Type 7 LSA to inform an ABR (e.g., R2 and/or R3) about an external route. The ABR translates the Type 7 LSA to a Type 5 LSA, and forwards the Type 5 LSA to routers of the OSPF routing area (e.g., the backbone area 102).

In some examples, in an OSPF deployment with multiple ABRs (e.g., R2 and R3 in FIG. 1), the router with a highest router identifier (ID) will perform the translation between Type 7 LSAs and Type 5 LSAs. In the example of FIG. 1, it is assumed that the router R3 has the higher router ID, which performs the translation of Type 7 LSA to Type 5 LSA.

When the router R3 receives a Type 7 LSA from the router R4, the router R3 translates from the Type 7 LSA to Type 5 LSA. The router R3 then distributes the Type 5 LSA to the routers R1 and R2 (and possibly other routers) of the backbone area 102. In the example of FIG. 1, it is assumed that the outside router R4 has a router ID of 20.0.0.3/8, where 20.0.0.3 is the IP address of the outside router R4. Although a specific router ID and IP address is provided, it is noted that in other examples, different router IDs and IP addresses may be assigned the outside router R4.

The Type 5 LSA sent by the router R3 that includes the information of the route to the outside router R4 includes a forwarding address for the outside router R4. In this example, the forwarding address in the Type 5 LSA is set to 20.0.0.3, which is the IP address of the outside router R4.

In performing the advertising of the external route to the forwarding address using the Type 5 LSA, the router R3 becomes the next hop for the information that the router R3 distributes to the backbone area 102. As a result, if a forwarding address is not used (i.e., not included in the Type 5 LSA sent by the router R3), when the router R2 receives a data packet (such as from the router R1 of the backbone area 102) that is destined to an external address, the router R2 forwards the data packet to the router R3. The router R3 then forwards the data packet to the outside router R4. The foregoing adds an extra hop (the hop between the routers R2 and R3) when routing the data packet to the external address.

To avoid the extra hop in the forwarding of the data packet by the router R2 toward the outside router R4, a forwarding address can be used. More specifically, the router R3 includes a forwarding address advertising engine 112 that adds a forwarding address (of the outside router R4) to the Type 5 LSA when advertising the external route connected to the outside router R4.

As used here, an "engine" can refer to a hardware processing circuit, which can include any or some combination of the following: a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

In some examples, the value of the forwarding address in an LSA specified by a boundary router (e.g., the router R3 in the FIG. 1 example) can be either 0.0.0.0 or non-zero. A forwarding address of 0.0.0.0 indicates that the originating router (e.g., R3) that sent the LSA is the next hop. A non-zero forwarding address indicates that the forwarding address is of another router different from the originating router.

In the ensuing discussion, reference to including a forwarding address in an LSA is a reference to including a non-zero forwarding address in the LSA. An LSA including a forwarding address of 0.0.0.0 (or other null value) is considered to not include a forwarding address.

By including the (non-zero) forwarding address in the Type 5 LSA advertising the external route to the outside router R4, the extra hop that passes through the router R3 can be bypassed because the router R3 can specify another router's (i.e., the outside router R4 in the FIG. 1 example) network address as the forwarding address.

As a result, when the router R2 receives a data packet from the router R1 or another router of the backbone area 102 destined for an address in an external domain, the router R2 forwards the data packet to the outside router R4 using the forwarding address (instead of sending the data packet to the router R3 for forwarding to the router R4). The result is that the extra hop through the router R3 is bypassed.

If the outside router R4 experiences a fault, then the external route to the outside router R4 would no longer be valid. To avoid relying on OSPF convergence to recalculate new routes in response to the detected fault of the outside router R4, the router R3 includes a forwarding address fault detection engine 114 that establishes a fault detection session that is able to detect the fault of the outside router R4 and to cause application of a resolution to address the fault associated with the forwarding address assigned to the outside router R4, in a time duration that is shorter than the time duration to perform OSPF convergence.

In some examples, the fault detection session that can be established by the router R3 is a fault detection session between the router R3 and the outside router R4. The fault detection session can include a Bidirectional Forwarding Detection (BFD) session. An example of BFD is described in Internet Engineering Task Force (IETF) Request for Comments (RFC) 5880, entitled "Bidirectional Forwarding Detection (BFD)," dated June 2010.

BFD provides for rapid detection of communication failures between adjacent devices, to allow for establishment of alternate paths. In the BFD session established between the routers R3 and R4, the routers R3 and R4 can exchange BFD packets on a periodic basis. A BFD packet can include various information as described in RFC 5880. If a respective router of the routers R3 and R4 stops receiving BFD packets for a time duration that exceeds a specified duration, then the respective router can assume that the path between the routers R3 and R4 has failed (such as due the other router becoming non-operational or experiencing a fault, or a link becoming non-operational).

In other examples, instead of using BFD, the routers R3 and R4 can establish a different type of fault detection session. More generally, in a fault detection session, the routers R3 and R4 can use some type of heartbeat or liveliness mechanism to allow one of the routers to check that a communication path to the other router remains active.

If the router R3 detects in the fault detection session that a path to the outside router R4, then that is an indication to the router R3 that a fault of the forwarding address assigned to the outside router R4 has occurred. In response to detecting the fault of the forwarding address assigned to the outside router R4, the forwarding address fault detection engine 114 of the router R3 is able to send an indication to other routers in the backbone area 102. The indication that is sent by the router R3 indicates that the forwarding address is no longer accessible. As explained further below, the indication sent by the forwarding address fault detection engine 114 indicating that the forwarding address is no longer available can be in the form of an LSA including specified content.

Figure 2:
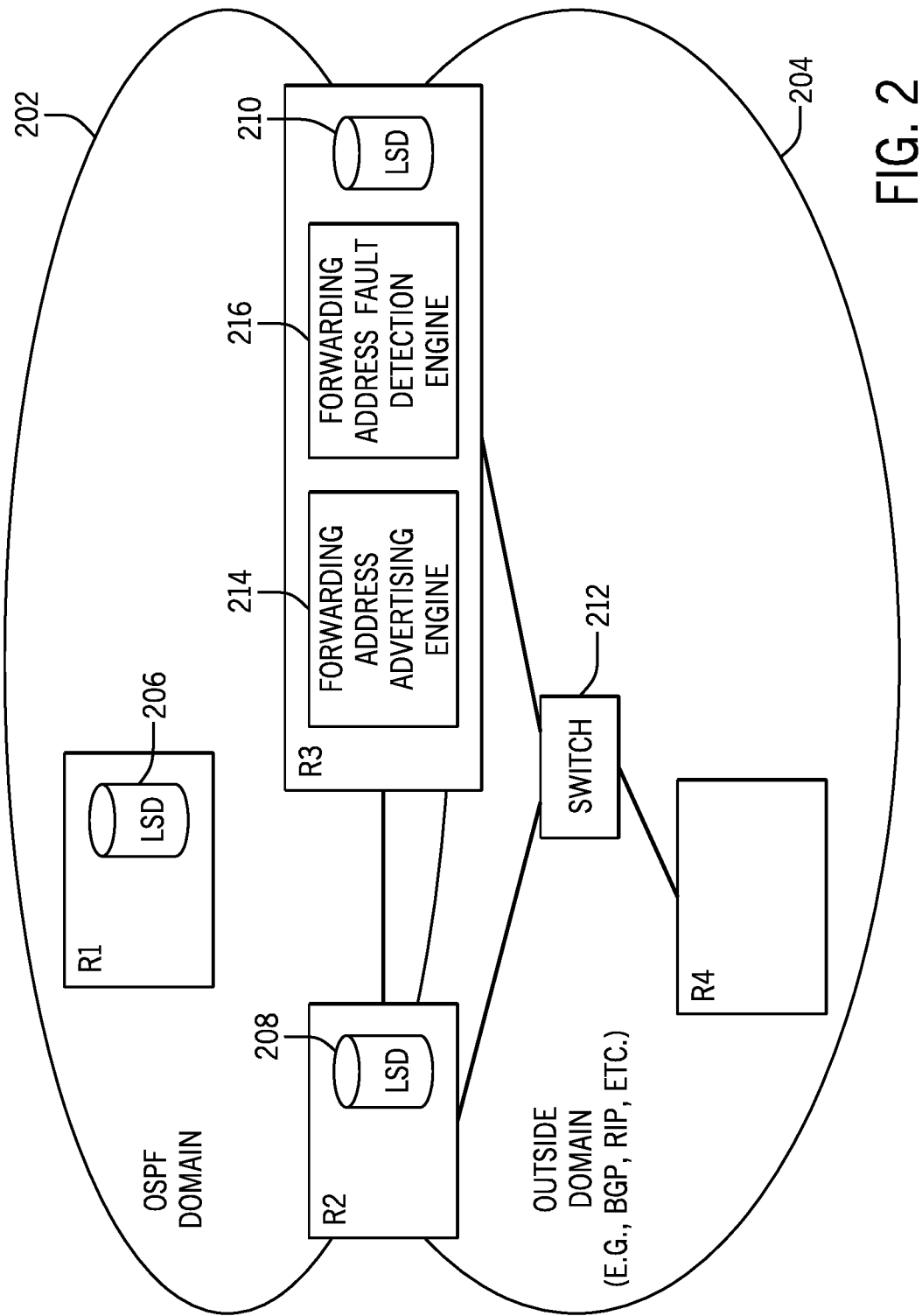
FIG. 2 is a block diagram of a network arrangement according to further examples.

FIG. 2 is a block diagram of another example network arrangement that includes an OSPF domain 202 and an external domain 204. In some examples, each domain includes a collection of routers and corresponding links that are under the control of a network operator (or group of network operators) and that use a common routing policy. In the example of FIG. 2, the OSPF domain 202 operates according to the OSPF protocol, and the external domain 204 operates according to a different routing protocol, such as BGP, RIP, or another routing protocol.

In the example of FIG. 2, the OSPF domain 202 can include an OSPF backbone area and possibly other OSPF routing area(s).

From the perspective of the OSPF domain 202, an external route is a route redistributed into the OSPF domain 202 from another protocol. An example of an external route in the context of FIG. 2 is a route in the external domain 204.

In the example of FIG. 2, routers R2 and R3 are autonomous system boundary routers (ASBRs) at the boundary between the OSPF domain 202 and the external domain 204. An ASBR is able to run both the OSPF protocol of the OSPF domain 202 and the different routing protocol (e.g., BGP, RIP, etc.) used by the external domain 204. An ASBR is able to learn (using the routing protocol of the external domain 204) external routes used in the external domain 204, and is able to propagate the learned external routes to the OSPF domain 202 to update the LSDs 206, 208, and 210 of routers R1, R2, and R3 of the OSPF domain 202.

In the example of FIG. 2, it is assumed that the router R3 (but not router R2) exchanges routing information with an outside router R4 in the external domain 104. As a result, the router R3 is able to learn an external route between the router R3 and the router R4.

As further shown in FIG. 2, the external domain 204 includes a layer 2 switch 212 that connects the outside router R4 to each of the boundary routers R2 and R3.

The router R3 distributes the information learned from router R4 into the OSPF domain 202, by advertising the information to the rest of the OSPF domain 204. The advertising is performed by the router R3 sending LSAs to other routers of the OSPF domain 204.

As noted above in connection with FIG. 1, in performing the advertising, the router R3 becomes the next hop for the information that the router R3 distributes to the OSPF domain 202. As a result (assuming that a forwarding address for the router R4 is not advertised by the router R3), when the router R2 receives a data packet from the OSPF domain 202 destined for an address in the external domain 204, the router R2 forwards the data packet to the router R3. The router R3 then forwards the data packet to the outside router R4 in the external domain 204.

To avoid the extra hop in the forwarding of the data packet by the router R2 toward the outside router R4 of the external domain 204, a forwarding address can be used. More specifically, when advertising the external route to the outside router R4 of the external domain 204, a forwarding address advertising engine 214 (similar to the forwarding address advertising engine 112 of FIG. 1) of the router R3 can include a forwarding address in each LSA transmitted by the router R3 that includes information pertaining to the external route.

By including the forwarding address in the LSA advertising the external route, the extra hop that passes through the router R3 can be avoided because the router R3 can specify another router's (i.e., the router R4 in the FIG. 2 example) network address (e.g., IP address) as the forwarding address.

As a result, when the router R2 receives a data packet from the OSPF domain 202 destined for an address in the external domain 204, the router R2 forwards the data packet to the outside router R4 using the forwarding address (instead of forwarding the data packet to the router R3 for forwarding to the router R4). The result is that the extra hop through the router R3 is avoided.

The router R3 further includes a forwarding address fault detection engine 216 (similar to the forwarding address fault detection engine 114 of FIG. 1) that is able to establish a fault detection session (e.g., a BFD session) between the router R3 and the outside router R4, to detect a fault of the outside router R4. The forwarding address fault detection engine 114 can perform similar actions in response to detection of a fault of the outside router R4 as those performed by the forwarding address fault detection engine 114 of FIG. 1.

Figure 3:
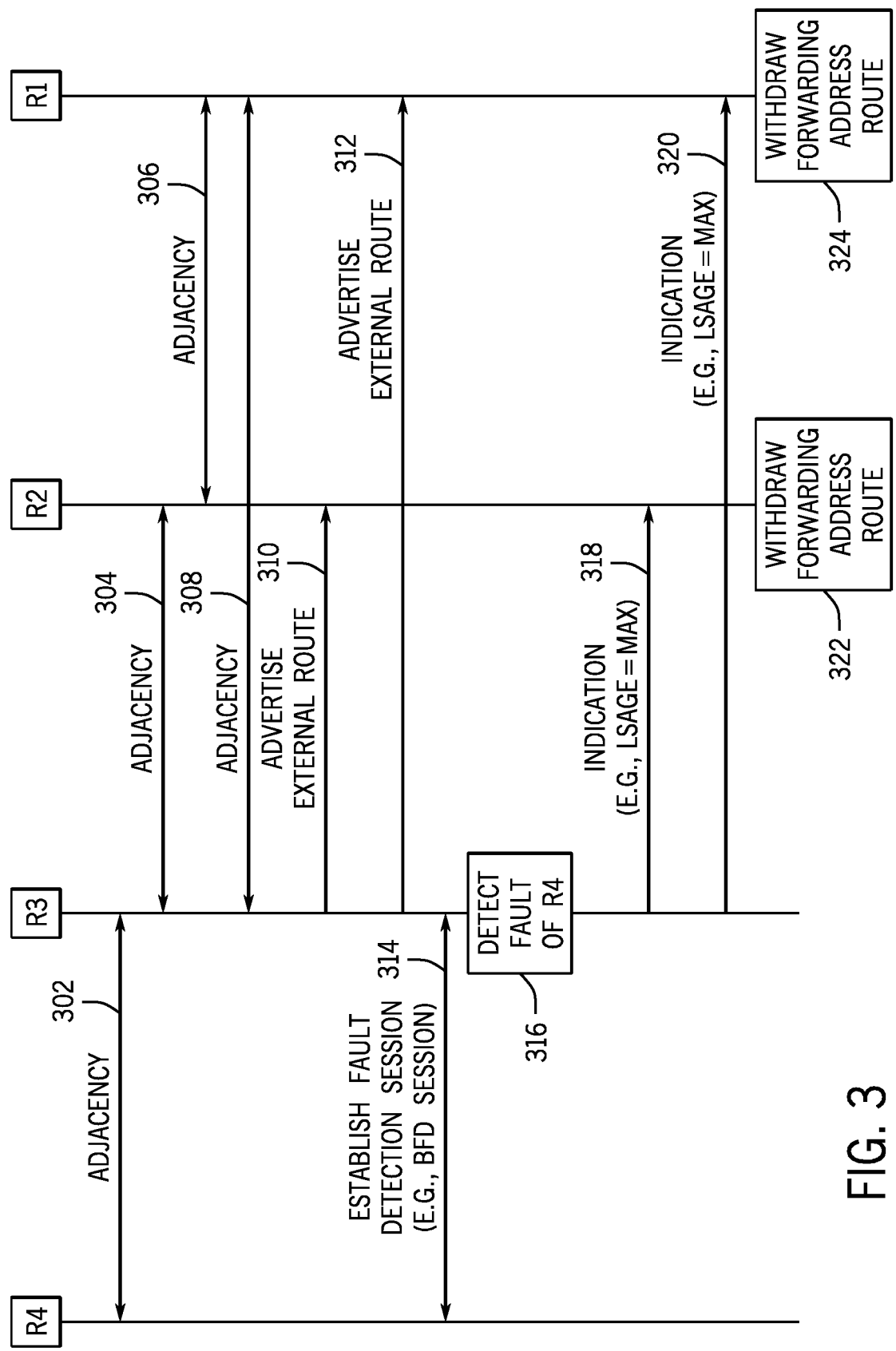
FIG. 3 is a message flow diagram of a process according to some examples.

FIG. 3 is a message flow diagram of a process performed by various routers R1, R2, R3, and R4, which can be the corresponding routers in FIG. 1 or 2. The router R4 is an outside router, while the routers R1, R2, and R3 are OSPF routers.

In the example of FIG. 3, the routers R3 and R4 can perform an adjacency procedure (at 302) that allows the routers R3 and R4 to learn a route (or routes) between R3 and R4. In some examples, the adjacency procedure (at 302) can be according to BGP or another routing protocol.

The routers R1, R2, and R3 can perform corresponding OSPF adjacency procedures (304, 306, 308), where each respective router can learn route(s) to an adjacent router. An OSPF adjacency procedure involves the transmission of LSAs between routers. In response to a received LSA, a router adds the information of the LSA into the LSD of the router.

Based on the learned external route to the outside router R4, the router R3 (and more specifically, the forwarding address advertising engine 112 (FIG. 1) or 214 (FIG. 2)) can advertise the external route (at 310, 312) with a forwarding address set to the network address of the outside router R4. More specifically, the advertising performed at 310, 312 includes sending respective LSAs by the router R3 with the forwarding address set to the network address of the outside router R4.

In accordance with some implementations of the present disclosure, the router R3 (and more specifically, the forwarding address fault detection engine 114 (FIG. 1) or the forwarding address fault detection engine 216 (FIG. 2)) establishes (at 314) a fault detection session between the routers R3 and R4. In response to the forwarding address fault detection engine in the router R3 detecting (at 316) a fault of the outside router R4 (e.g., due to the outside router R4 becoming non-operational or experiencing a fault, or due to the link between R3 and R4 becoming non-operational, etc.), the forwarding address fault detection engine of the router R3 sends (at 318, 320) indications to routers R2 and R1, respectively, of the fault. The indications cause the routers R2 and R1 to withdraw external routes to the forwarding address.

In some examples, the indication sent at (318 or 320) can be in the form of an LSA with a link-state age (LSAge) set to a specified maximum value. The setting of the link-state age in an LSA to the specified maximum value is an indication that a route with the specified forwarding address is to be withdrawn. In response to the LSA with the link-state age set to the specified maximum value, the routers R2 and R1 withdraw (at 322 and 324, respectively) each route to the specified forwarding address. This can be accomplished by removing entries in the respective LSD of the router R2 and R1 that correspond to the specified forwarding address.

Figure 4:
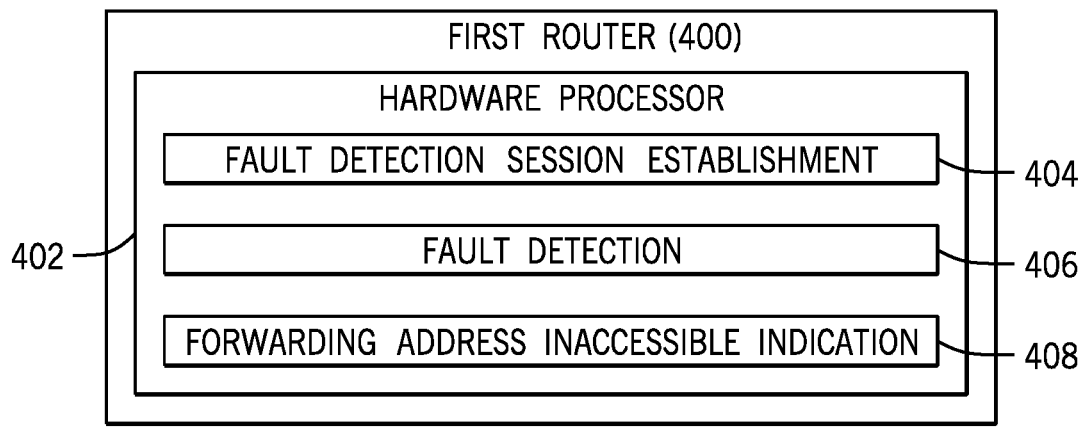
FIG. 4 is a block diagram of a router according to some examples.

FIG. 4 is a block diagram of a first router 400 (e.g., R3 in FIG. 1 or 2) that includes a hardware processor 402 to perform various tasks. A hardware processor can include any or some combination of a microprocessor, a core of a multi-core microprocessor, a microcontroller, a programmable integrated circuit, a programmable gate array, or another hardware processing circuit. A hardware processor performing a task can refer to a single hardware processor performing the task or multiple hardware processors performing the task.

The various tasks that can be performed by the hardware processor 402 include a fault detection session establishment task 404 that establishes a fault detection session between the first router 400 (e.g., R3 in FIG. 1 or 2) connected to a routing area (e.g., 102 in FIG. 1 or a routing area in the OSPF domain 202 of FIG. 2) and an outside router (e.g., R4 in FIG. 1 or 2) assigned a forwarding address. The outside router is located outside the routing area. The forwarding address can be used by a second router (e.g., R2 in FIG. 1 or 2) of the routing area to send a data packet to the outside router.

The various tasks further include a fault detection task 406 to detect, in the fault detection session, a fault associated with the outside router. The various tasks also include a forwarding address inaccessible indication task 408 to, in response to detecting the fault associated with the outside router in the fault detection session, provide an indication to the routing area that the forwarding address is no longer accessible.

Figure 5:
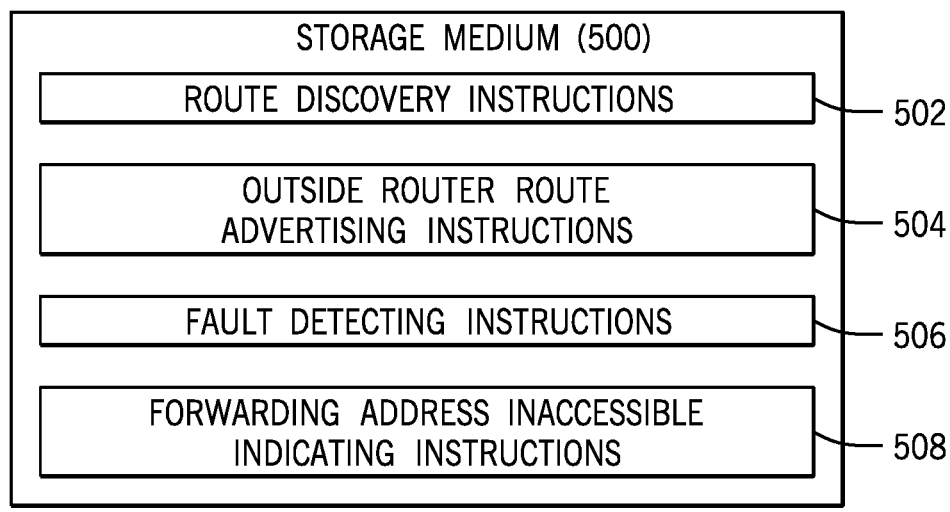
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a boundary router (e.g., R3 in FIG. 1 or 2) to perform various tasks.

The machine-readable instructions include route discovery instructions 502 to discover a route to an outside router (e.g., R4 in FIG. 1 or 2) that is outside of a routing area to which the boundary router is connected, the boundary router connected to the routing area.

The machine-readable instructions further include outside router route advertising instructions 504 to advertise the route to a router of the routing area, the outside router assigned a forwarding address, and the forwarding address usable by the router of the routing area to send a data packet to the outside router, the sending of the data packet bypassing the boundary router as an extra hop.

The machine-readable instructions further include fault detecting instructions 506 to detect a fault associated with the outside router. The machine-readable instructions further include forwarding address inaccessible indicating instructions 508 to, in response to detecting the fault associated with the outside router, provide an indication to the routing area that the forwarding address is no longer accessible.

Figure 6:
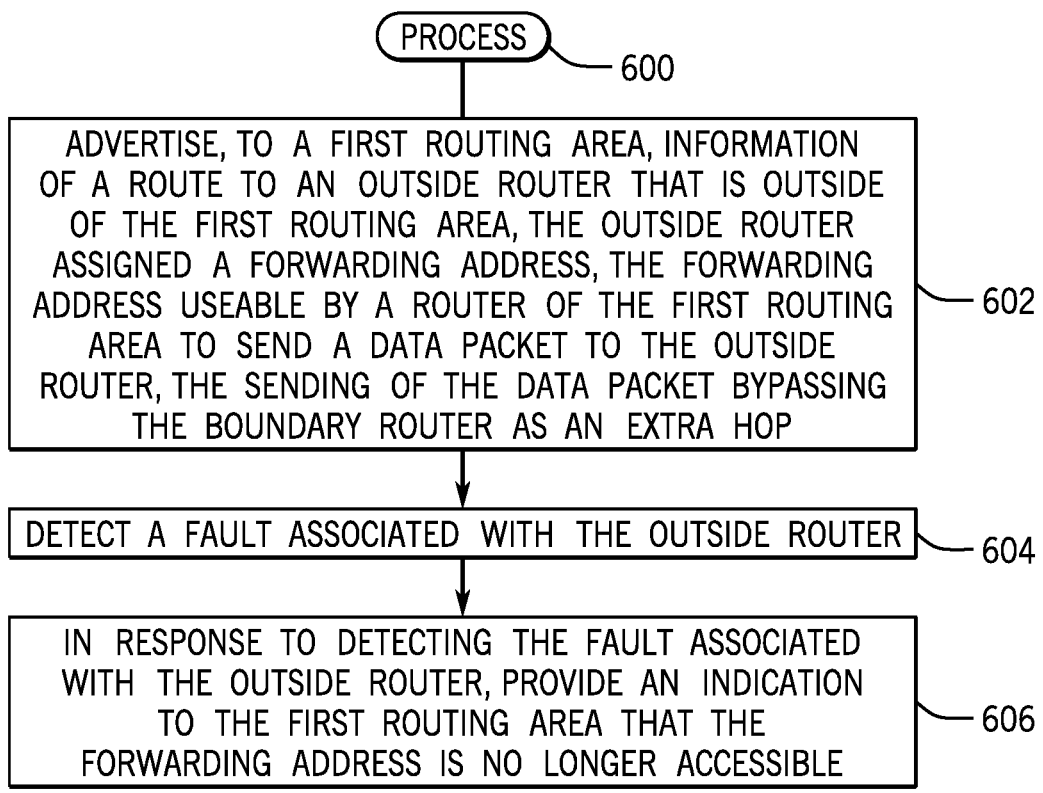
FIG. 6 is a flow diagram of a process performed by a boundary router according to some examples.

FIG. 6 is a flow diagram of a process 600 performed by a boundary router (e.g., R3 in FIG. 1 or 2) connected to a first routing area.

The process 600 includes advertising (at 602), to the first routing area, information of a route to an outside router that is outside of the first routing area, the outside router assigned a forwarding address, the forwarding address usable by a router of the first routing area to send a data packet to the outside router, the sending of the data packet bypassing the boundary router as an extra hop.

The process 600 further includes detecting (at 604) a fault associated with the outside router. In response to detecting the fault associated with the outside router, the process 600 provides (at 606) an indication to the first routing area that the forwarding address is no longer accessible.

The storage medium 500 of FIG. 5 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A first router comprising:
a non-transitory storage medium storing instructions which when executed by a hardware processor cause the hardware processor to:
maintain adjacency with an outside router located outside a routing area in which the first router resides;
advertise, to a second router in the routing area, information of an external route to the outside router, wherein the external route allows the second router to send packets to the outside router without traversing the first router;
establish a fault detection session between the first router and the outside router;
detect, in the fault detection session, a fault associated with the outside router; and
in response to detecting the fault associated with the outside router in the fault detection session, provide an indication to the routing area that the external route is no longer valid.

2. The first router of claim 1, wherein the first router and the second router are configured to determine a route based on an Open Shortest Path First (OSPF) protocol, and wherein the routing area includes an OSPF routing area.

3. The first router of claim 2, wherein the routing area is a first type of OSPF routing area, and wherein the outside router is in a second type of OSPF routing area different from the first type of OSPF routing area.

4. The first router of claim 3, wherein the second type of OSPF routing area comprises a not-so-stubby area (NSSA).

5. The first router of claim 2, wherein the routing area is part of an OSPF domain, and wherein the outside router is part of an external domain that uses a routing protocol different from the OSPF routing protocol.

6. The first router of claim 1, wherein the outside router is located in a domain that uses a routing protocol different from a routing protocol used in the routing area.

7. The first router of claim 1, wherein the fault detection session is established according to a Bidirectional Forwarding Detection (BFD) protocol.

8. The first router of claim 1, wherein the indication includes a link-state advertisement (LSA) comprising a link-state age set to a specified maximum value.

9. The first router of claim 1, wherein the providing of the indication to the routing area comprises sending the indication to other routers of the routing area.

10. The non-transitory machine-readable storage medium of claim 9, wherein the outside router is located in a domain that uses a routing protocol different from a routing protocol used in the routing area.

11. A non-transitory machine-readable storage medium storing instructions that upon execution cause a first router to:
maintain adjacency with an outside router that is outside of a routing area in which the first router resides;
advertise, to a second router in the routing area, information of an external route to the outside router, wherein the external route allows the second router to send packets to the outside router without traversing the first router;
establish a fault detection session between the first router and the outside router;
detect, in the fault detection session, a fault associated with the outside router; and
in response to detecting the fault associated with the outside router in the fault detection session, provide an indication to the routing area that the external route is no longer valid.

12. The non-transitory machine-readable storage medium of claim 11, the first router and the second router are configured to determine a route based on Open Shortest Path First (OSPF) protocol, and wherein the routing area includes an OSPF routing area.

13. The non-transitory machine-readable storage medium of claim 12, wherein the routing area is a first type of OSPF routing area, and the outside router is in a second type of OSPF routing area different from the first type of OSPF routing area, and wherein the second type of OSPF routing are comprises a not-so-stubby area (NSSA).

14. The non-transitory machine-readable storage medium of claim 12, wherein the routing area is part of an OSPF domain, and wherein the outsider router is part of an external domain that uses a routing protocol different from the OSPF routing protocol.

15. The non-transitory machine-readable storage medium of claim 11, wherein the
fault detection session is established according to a Bidirectional Forwarding Detection (BFD) protocol.

16. A method performed by a first router residing in a routing area, comprising:
maintaining adjacency with an outside router located outside the routing area;
advertising, to a second router in the routing area, information of an external route to the outside router, wherein the external route allows the second router to send packets to the outside router without traversing the first router;
establishing a fault detection session between the first router and the outside router;
detecting, in the fault detection session, a fault associated with the outside router; and
in response to detecting the fault associated with the outside router in the fault detection session, providing an indication to the routing area that the external route is no longer valid.

17. The method of claim 16, wherein the outside router is located in a domain that uses a routing protocol different from a routing protocol used in the routing area.

18. The method of claim 17, wherein the first router and the second router are configured to determine a route based on an Open Shortest Path First (OSPF) protocol, and wherein the routing area includes an OSPF routing area.

19. The method of claim 18, wherein the routing area is a first type of OSPF routing area, and the outside router is in a second type of OSPF routing area different from the first type of OSPF routing area, and wherein the second type of OSPF routing are comprises a not-so-stubby area (NSSA).

20. The method of claim 18, wherein the routing area is part of an OSPF domain, and wherein the outsider router is part of an external domain that uses a routing protocol different from the OSPF routing protocol.

* * * * *